June 14, 1938.  J. W. McNAIRY  2,120,954
CONTROL SYSTEM
Filed April 28, 1937  3 Sheets-Sheet 2

Inventor:
Jacob W. McNairy,
by Harry E. Dunham
His Attorney.

June 14, 1938.  J. W. McNAIRY  2,120,954
CONTROL SYSTEM
Filed April 28, 1937  3 Sheets-Sheet 3

Inventor:
Jacob W. McNairy,
by Harry E. Dunham
His Attorney.

Patented June 14, 1938

2,120,954

UNITED STATES PATENT OFFICE 2,120,954

CONTROL SYSTEM

Jacob W. McNairy, Erie, Pa., assignor to General Electric Company, a corporation of New York Application April 28, 1937, Serial No. 139,437

24 Claims. (Cl. 172—179)

My invention relates to control systems for electric vehicles such as electric cars, elevators and the like, more particularly to dynamic braking motor control systems for electric vehicles, and has for an object the provision of a simple, reliable, and inexpensive control system of this character.

In a copending application of John F. Tritle Serial No. 131,391, filed March 17, 1937, entitled "Control systems", which application is assigned to the same assignee as the present application, an improved motor control system for electric vehicles is described, together with other features, in which the vehicle driving motors are accelerated by excluding resistance from the motor circuits through timed operation of a resistance controller. The resistance controller is operable between two positions and during operation in one direction excludes a first resistor from the motor circuit, suitable transfer means associated with the controller being arranged for operation upon exclusion of the first resistor for quickly excluding other resistors and reinserting the first resistor in the motor circuits for exclusion a second time during return operation of the resistance controller to its first position.

In order to provide for uniformly smooth dynamic braking of the vehicle over a wide range of speeds, the controller in the system disclosed in the said Tritle application is arranged for operation through four trips between its two positions during braking progressively to exclude the braking resistance as the vehicle slows down, and the transfer means is arranged to exclude quickly selected other resistors and to reinsert quickly the first resistor upon the completion of each trip of the controller. The speed of operation of the resistance controller is governed by a current responsive relay during both acceleration and braking and field shunting means are provided for controlling the motor fields during both initial and final acceleration of the vehicle.

While I have disclosed my invention as applied to a system containing the above mentioned features described in the aforesaid Tritle application, these features are the invention of the said John F. Tritle and claimed in his aforesaid application, and I therefore do not claim them herein.

Since it is often necessary to initiate braking with the vehicle operating at approximately its maximum speed, a relatively large amount of braking resistance is normally connected initially in the braking circuit for progressive exclusion as the vehicle slows down. Therefore when braking is initiated at a lower speed, a portion of this resistance must be excluded from the braking circuit before effective and maximum dynamic braking effort can be obtained.

It is of course highly important that the dynamic braking become effective immediately when called for and accordingly it is an object of my invention to provide an improved control system in which during coasting prior to braking the amount of braking resistance included in the braking circuit is adjusted in accordance with the speed of the vehicle so as to insure the quick application of dynamic braking when it is desired.

It is a still further object of my invention to provide a control system of this character in which the braking connections are established during coasting with the motor partially disabled as a generator, as by weakening its field by shunting, and the braking operation initiated by restoring the generator operation, as by strengthening the motor field.

More specifically, a fundamental feature of my invention is the regulation of the dynamic braking resistance during coasting in response to the current in the dynamic braking circuit, which current in turn is responsive to the speed of the motor, in such manner as to maintain a predetermined current during coasting of such small or nominal value that no appreciable dynamic braking torque is established. The weakening of the motor field permits the use of a higher nominal current in the motor and dynamic braking circuit without appreciable braking torque. By thus maintaining the nominal current, the dynamic braking resistance is preselected of such value that a predetermined braking torque is immediately applied when the field shunt is removed. This weakening of the fields provides also for the ready establishment of braking by the removal of the field shunting, the setting of the current responsive means being changed at the same time so as to cause it to maintain a higher current for dynamic braking. The control devices follow the current responsive means during both coasting and dynamic braking.

During the coasting period the fields of the motors are energized from an auxiliary source such as a storage battery, whereby the motors are caused to build up as generators with shunt field characteristics. At that time the motors are unable to build up as series generators because of the weakening of their fields by shunting.

For a more complete understanding of my invention, reference should now be had to the drawings in which.

Figure 1:
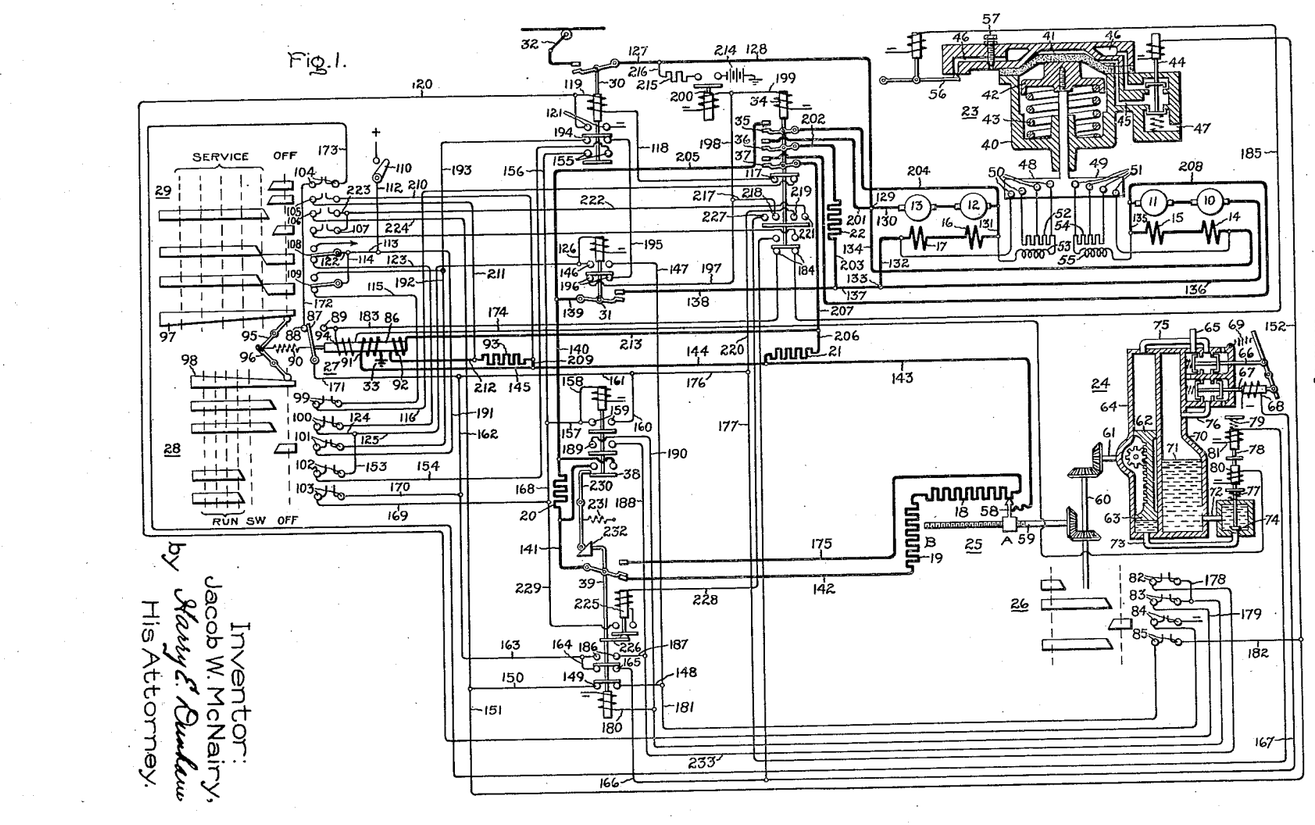
Fig. 1 is a somewhat diagrammatic illustration of a control system embodying my invention.

Referring now to the drawings, although my invention is not limited thereto, I have shown my invention for purposes of illustration as applied to a control system of the type described and claimed in the above referred to Tritle application. As shown, this control system includes a plurality of traction or driving motors 10 to 13 inclusive having series field windings 14 to 17 inclusive respectively. The principal elements and devices incorporated in this control system comprise a plurality of motor controlling resistors 18, 19, 20, 21, and 22; field shunting means 23 for the field windings 14 to 17 inclusive; a fluid pressure operating device 24 for driving a controller 25 associated with the resistor 18; a cam switch 26 also driven by the operating device 24; an accelerating and decelerating relay 27 for controlling the speed of operation of the field shunting means 23 and the operating device 24 in accordance with the motor current; and master control means including a master accelerating controller 28 and a master braking controller 29.

In addition, the control system includes a pair of line circuit breakers 30 and 31 for connecting the motors to the source of energy represented by a trolley 32 and a ground connection 33; a braking switch 34 having a plurality of main contacts 35, 36, and 37 for connecting the motors in a dynamic braking circuit with the motor controlling resistors; a cushioning contactor 38 for controlling the resistor 20; and a transfer switch 39 which cooperates with the controller 25 to control the resistors 18 and 19.

Inasmuch as a complete understanding of my invention may best be had from a description of the operation, certain of the operating devices and elements will first be briefly described and the operation will then be set forth in detail.

The field shunting means 23 is of the type described and claimed in a copending application of John F. Tritle and Jacob W. McNairy, Serial No. 138,818, filed April 24, 1937, entitled "Control systems", which application is assigned to the same assignee as the present invention and therefore not claimed herein. It comprises a multiple contact pressure operating switch for progressively shunting the motor fields. As here shown, this pressure operating switch comprises a casing 40 having a flexible diaphragm 41 for controlling a plunger 42 which is normally biased to its uppermost position by a spring 43. Fluid pressure is supplied to the upper side of the diaphragm 41 from a suitable source of pressure through an electrical control valve 44 which is normally biased to the position shown to connect the upper side of the diaphragm to atmosphere through a passageway 45, the upper port of the valve 44, and an exhaust passageway 46.

When the operating winding of the valve 44 is energized, the valve is operated to its lowermost position to connect the upper side of the diaphragm to a suitable source of fluid pressure through a supply passageway 47, the lower port of the valve 44 and the passageway 45, and the plunger 42 is thereupon moved downwardly against the bias of the spring 43. Mounted on the lower end of the plunger 42 is a plurality of cooperating contacts shown as comprising a pair of conducting segments 48 and 49 arranged normally to engage cooperating sets of fixed contacts 50 and 51 respectively.

As shown, the contacts 50 in cooperation with the conducting segment 48 control a shunt circuit for the field windings 16 and 17, which shunt circuit includes a tapped resistor 52 and a reactor 53. Similarly, the contacts 51 and the conducting segment 49 control a shunt circuit for the field windings 14 and 15, which shunt circuit includes a tapped resistor 54 and a reactor 55. With the conducting segments 48 and 49 in the normal position shown, the field windings are completely shunted, only the reactors 53 and 55 being included in the shunt circuits. As the conducting segments 48 and 49 move downwardly upon the application of fluid pressure to the upper side of the diaphragm 41, the contacts 50 and 51 are progressively disengaged so as to insert the resistors 52 and 54 in the shunt circuits, the final movement of the segments 48 and 49 completely interrupting the shunt circuits.

In order to control the speed at which the conducting segments 48 and 49 move upwardly when the diaphragm 41 is connected to the exhaust passageway 46, and thus to control the rate at which the fields are shunted, the exhaust passageway 46 is provided with an electrically operated plug valve 56 arranged selectively to restrict the exhaust passageway. Thus, when the plug valve 56 is closed, movement of the segments 48 and 49 is substantially arrested. In addition, the exhaust passageway 46 is provided with an adjustable needle valve 57 for providing an additional adjustment of the rate at which pressure is exhausted from the upper side of the diaphragm 41.

The controller 25 may be of any suitable type, but is preferably of the commutator type described and shown in another copending application of John F. Tritle, Serial No. 22,745, filed May 22, 1935, entitled "Control systems", which application is assigned to the same assignee as the present invention. For purposes of illustration, the controller 25 is here shown as comprising a movable brush arm mounted for axial movement along a rotatable shaft 59 to vary the resistor 18.

The rotatable shaft 59 is suitably connected, as shown, through suitable gearing and an intermediate shaft 60, to the operating shaft 61 of the fluid operating device and comprises a pair of opposing pistons 62 and 63 reciprocating within a cylinder casing 64 and connected, as shown, by means of a suitable rack and pinion to the operating shaft 61. Fluid pressure is supplied from a suitable source (not shown), such as a source of compressed air, through a supply pipe 65 and is controlled by a pair of double acting valves 66 and 67 which are interconnected for operation by a single operating winding 68, the valves being biased to the position shown by means of a spring 69. Adjacent the cylinder casing 64 is a timing chamber 70 within which is a body of incompressible liquid 71, such for example as oil, which body communicates with the lower side of the piston 63 through suitable conduits 72 and 73 and a restricted orifice controlled by a valve 74.

Thus, when the operating winding 68 is deenergized, pressure is admitted directly from the supply pipe 65 through the left-hand port of the valve 66 and through a conduit 75 to the piston 62 so as to force the reciprocating pistons downwardly to the position shown, the movable arm 58 of the controller 25 being thus operated to the position indicated by the letter A in the drawings. Likewise, when the operating winding 68 is energized, the valves 66 and 67 are reversed so that the fluid pressure on the piston 62 is exhausted to atmosphere through the right-hand port of the valve 66 and fluid pressure is admitted through the left-hand port of the valve 67 to the conduit 76 and the timing chamber 70. The incompressible liquid 71 is thus forced through the conduits 72 and 73 and through the restricted orifice controlled by the valve 74 so as to operate the piston 63 upwardly and move the brush arm 58 of the controller 25 in a left-hand direction from the position A toward the position indicated by the letter B in the drawings.

It will now be apparent that the speed at which the reciprocating pistons 62 and 63 move in either direction depends upon the degree of restriction interposed by the valve 74 to the flow of the incompressible liquid through the conduits 72 and 73. Normally this valve is biased to the partially open position, shown, by a spring 77 in which position the upper end of the valve stem engages a stop pin 78 which is normally biased to the position shown by a spring 79. The valve 74 is provided with an energizing winding, or stop coil, 80 and the stop pin 78 is controlled by a similar energizing winding or speed coil 81.

Thus, when the winding 80 is energized, the valve 74 is moved downwardly against the bias of the spring 77 to close the conduit 73 and stop the movement of the pistons 62 and 63 by preventing the flow of the incompressible liquid 71 through the conduit. When both of the windings 80 and 81 are deenergized, the pistons operate at a normal or low speed, the flow of fluid being partially restricted by the valve 74 and when the winding 81 is alone energized so as to retract the stop pin 78, the valve 74 is opened further by the spring 77 to increase the size of the flow controlling orifice in the conduit 73 and thus provide for high speed operation of the pistons 62 and 63. Mounted on the intermediate shaft 60 for movement with the brush arm 58 is the cam switch 26 which is provided with a plurality of pairs of contacts 82, 83, 84, and 85 arranged to be operated between open and closed circuit positions by a plurality of associated cams.

The accelerating relay 27 which controls the speed of operation of the operating device 24 and the field shunting means 23 under certain conditions is of the type described and claimed in the above referred to Tritle and McNairy application and is mounted adjacent the master controllers 28 and 29. This relay comprises a movable armature or core 86 for operating a pivoted contact member 87 having cooperating front and back contacts 88 and 89 respectively. The contact member 87 is normally biased into engagement with the front contact 88 by a spring 90 and the armature 86 is provided with a pair of series windings 91 and 92, the winding 91 being connected in the accelerating circuit and the winding 92 being connected across the resistor 21 which is connected in the braking circuit during coasting and braking operation. In accordance with my invention, a calibrating resistance 93 is provided which is selectively inserted and removed from the circuit of the winding 92 in order abruptly to adjust the setting of the relay 27 upon the transition from coasting to braking operation, as will be more fully described hereinafter.

In addition, the accelerating and decelerating relay 27 is provided with a shunt winding 94 associated with the movable core 86 and arranged magnetically to oppose the series coils 91 and 92, the energization of the shunt winding 94 being controlled by the back contact 89 in a manner to be more fully described hereinafter. The current setting of the accelerating and decelerating relay 27 is determined by the spring 90, one end of which is connected to a pair of pivoted adjusting arms 95 and 96, the arm 95 being arranged to engage a cam 97 carried by the master braking controller 29 and the arm 96 being arranged to engage a similar cam 98 carried by the master accelerating controller 28. Thus it will be seen that upon movement of either of the controllers 28 or 29 from their respective off positions, the spring 90 is stressed to increase the current setting of the relay 27.

As shown, the accelerating controller 28 is provided with a plurality of cam switches 99 to 103 inclusive arranged for operation by a plurality of corresponding cams and the braking controller 29 is provided with a plurality of cam switches 104 to 109 inclusive arranged for operation by suitable corresponding cams. The master accelerating controller 28 is movable from an off position through a switching position and a plurality of running positions and the braking controller 29 is movable between an off position and a plurality of service positions, the two master controllers, when in their respective off positions, providing for coasting operation of the vehicle.

It is now believed that a complete understanding of my invention may be had from a description of the operation of the system as a whole.

Referring now to Fig. 1, in which all of the control devices are shown in their respective deenergized positions, in order initially to energize the control circuits preparatory to acceleration of the vehicle, it is necessary first to close a control switch 110 which connects the control apparatus to a suitable source of control energy, which source has been indicated by conventional plus and minus signs in order to simplify the drawings.

Since the master controller 28 and the braking controller 29 are in their respective off positions corresponding to coasting operation, closure of the control switch 110 completes energizing circuits for the braking switch 34 and for a field flashing contactor 111 to establish the coasting circuits shown in Fig. 3, which circuits will be fully described hereinafter. The motors may now be connected to the main source of energy for acceleration by operating the master controller 28 from its off position to its switching position so as to open the normally closed cam switch 101 and to close the cam switches 99 and 100. Closure of the cam switches 99 and 100 establishes energizing circuits for the line circuit breakers 30 and 31 to connect the motors in the accelerating circuit shown in Fig. 2.

The energizing circuit for the line breaker 30 may be traced from the positive source of control energy through the control switch 110, the conductors 112, 113, and 114, the lower contacts of the cam switch 109 on the braking controller 29, the conductor 115, the cam switch 99, the conductor 116, the interlock contacts 117 on the braking switch 34, the conductor 118, the energizing winding of the line breaker 30, the conductors 119 and 120, and by way of the contacts 84 on the cam switch 26 to the negative source of control energy.

It will of course be apparent that the contacts 84 on the cam switch 26 are closed only so long as the cam switch 26 is in its A position and as soon as the line breaker 30 closes, a self-holding circuit is established which extends from the intersection of the conductors 119 and 120 through the interlock contacts 121 on the line breaker 30 to the negative source of control energy. This holding circuit by-passes the contacts 84 so as to maintain the line breaker 30 energized even though the cam switch 26 and the controller 25 are operated from their respective A positions.

Similarly, the energizing circuit for the line breaker 31 may be traced from the positive source of control energy through the control switch 110, the conductors 112, 113 and 122, the lower contacts of the cam switch 108 on the braking controller 29, the conductor 123, the cam switch 100 on the master controller 28, and by way of the conductors 124, 125 and 126 to the operating winding of the line breaker 31 and the negative source of control energy.

Figure 2:
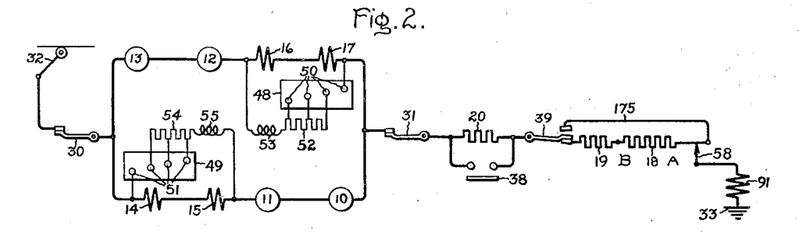
Fig. 2 is a simplified circuit diagram illustrating the accelerating circuit connections.

Upon closure of the line breakers 30 and 31, the motors are connected in the accelerating circuit shown in Fig. 2 with the motor fields shunted and the main power circuit thus established for the motors may be traced from the trolley 32 through the contacts of the line breaker 30 and the conductors 127 and 128 to a common connection point 129. At this common connection point 129, the current divides, part flowing through the conductor 130, the armatures of the motors 13 and 12, the conductor 131, the field windings 16 and 17, and by way of a conductor 132 to a second common connection point 133, while the other part of the current flows from the common connection point 129 through a conductor 134, the field windings 14 and 15, a conductor 135, the armatures of the motors 11 and 10, and by way of a conductor 136 to the common connection point 133.

From this common connection point 133, the current flows through the conductors 137 and 138, the contacts of the line breaker 31, the conductors 139 and 140, the resistor 20, a conductor 141, the lower contacts of the transfer switch 39, a conductor 142, the resistors 19 and 18, the movable brush arm 58 of the controller 25, the conductors 143, 144 and 145, and by way of the series winding 91 on the accelerating relay 27 to the ground connection 33.

As shown best in Fig. 2, the traction motors are thus permanently connected in a parallel bridge circuit with two of the motors connected in each arm of the bridge between the common connection points 129 and 133.

As explained above, the field shunting means 23 normally occupies a position to shunt the field windings of the motors and accordingly the motors now begin to accelerate with the field shunted. Closure of the line breaker 31, however, is effective to complete a circuit for the operating valve 44 of the field shunting means 23 and accordingly the pressure is immediately applied to the upper side of the diaphragm 41 so as to move the conducting segments 48 and 49 downwardly progressively to unshunt the field windings. This energizing circuit for the valve 44 may be traced from the intersection of the previously energized conductors 125 and 126 through the interlock contacts 146 on the line breaker 31, the conductors 147 and 148, the interlock contacts 149 on the transfer switch 39, and by way of the conductors 150, 151, and 152 through the energizing winding of the valve 44 to the negative source of control energy.

In order further to accelerate the motors after the field shunts have been removed, it is necessary to operate the master controller 28 from its switching position to a running position to effect closure of the cam switches 102 and 103. Closure of the cam switch 102 establishes an energizing circuit for the cushioning contactor 38 so as quickly to exclude the resistor 20 from the motor circuit and therefore effect further acceleration of the motors. This energizing circuit for the cushioning contactor 38 may be traced from the intersection of the previously energized conductors 124 and 125 through a conductor 153, the cam switch 102, a conductor 154, the interlock contacts 155 on the line breaker 30, and by way of the conductors 156, 157, and 158 to the energizing winding of the cushioning contactor 38 and the negative source of control potential.

Immediately upon closure of the cushioning contactor 38, an energizing circuit is established for the winding 68 of the operating device 24 so as to move the valves 66 and 67 and thereby apply pressure to the timing chamber 71 whereby the pistons 62 and 63 of the operating device 24 are moved in a direction to operate the brush arm 58 of the controller 25 from its A position toward its B position so as progressively to exclude the resistor 18 from the motor circuit.

This energizing circuit for the winding 68 of the operating device 24 may be traced from the intersection of the previously energized conductors 157 and 158 through the interlock contacts 159 on the cushioning contactor, conductors 160, 161, 162, 163 and 164, the interlock contacts 165 on the transfer switch 39, and by way of the conductors 166 and 167 to the winding 68 and the negative source of control potential. In order to further speed up the rate of acceleration provision is made that the winding 68 shall be energized even before the cushioning contactor 38 closes. To effect this a parallel energizing circuit is established which by-passes the interlock contact 159 on the cushioning contactor 38. This parallel circuit may be traced from the intersection of the conductors 156 and 157 through the conductors 168 and 169, the cam switch 103, and by way of the conductor 170 to the intersection of the conductors 162 and 163, from which point the energizing circuit is identical with the circuit just traced.

As soon as these energizing circuits for the winding 68 are completed, the operating device 24 begins to move at its high speed, due to the fact that the speed coil 81 is now energized. The energizing circuit for this speed coil may be traced from the intersection of the previously energized conductors 161 and 162 through a conductor 171, the switch arm 87 on the accelerating relay 27 which now engages its front contact 88, a conductor 172, the normally closed cam switch 104 on the braking controller 29, and by way of a conductor 173 to the speed coil 81 and the negative source of control energy.

As the brush arm 58 moves from its A position toward its B position, the accelerating relay 27 operates to control the speed of the operating device 24 so as to maintain a substantially constant predetermined accelerating current. So long as the accelerating current is below the predetermined value, the accelerating relay occupies the position shown, thereby energizing the speed coil 81 of the operating device 24. As soon as the motor current increases above a predetermined value, however, the resulting increase in the energization of the series winding 91 effects movement of the armature 86 so as to disengage the contact 87 from the front contact 88, whereupon the speed coil 81 is deenergized and the operating device 24 slowed down so as to drive the brush arm 58 at its normal or low speed.

Both the speed coil 81 and the stop coil 80 now being deenergized, the valve 74 occupies the position shown in the drawings which corresponds to the normal or average low speed of the operating device 24. But if the motor current continues to increase, the armature 86 on the accelerating relay 27 will be further operated so as to engage the movable contact 87 with the back contact 89 and thereby establish an energizing circuit for the stop coil 80. This energizing circuit extends from the movable contact 87 on the accelerating relay through the back contact 89, the shunt winding 94 on the accelerating relay, and by way of the conductor 174 to the stop coil 80 and the negative source of control energy. Energization of the stop coil 80 is of course effective to close the valve 74 and thereby arrest movement of the operating device 24 and the brush arm 58 of the controller 25.

As described and claimed in the said Tritle and McNairy application, if the operating device 24 is thus stopped and held by energization of the stop coil until the motor current drops to such a value that the series winding 91 of the accelerating relay releases the armature 86 for movement to disengage the pivoted contact 87 from the back contact 89, the brush arm 58 moves forward in a series of steps of such duration as to cause the motor current to undergo severe fluctuation. Accordingly, the shunt coil 94 on the relay is arranged so as to oppose the series winding 91 and cause the energizing circuit for the stop coil 80 to be interrupted immediately after this energizing circuit is closed. Thus, by connecting the shunt coil 94 for energization simultaneously with the stop coil 80, a vibrating characteristic is provided which causes a slow gradual movement of the brush arm 58, the speed of which depends upon the time that the contacts 87 and 89 remain closed. Thus, if a heavy current flows in the motor circuit, the contacts 87 and 89 remain closed a greater portion of the time and a very slow speed movement of the controller is obtained. If a somewhat smaller current is flowing, the contacts 87 and 89 remain closed only a brief portion of the time and accordingly a higher controller speed is obtained. It will be understood of course that in each case assumed the motor current flowing must be large enough to effect closure of the contacts 87 and 89 and likewise in each case the controller speed is less than the normal slow speed obtained when the movable contact 87 engages neither the front contact 88 nor the back contact 89.

It will be observed that the master controller 28 is provided with a plurality of running positions and that movement of the master controller from one to the other of these running positions does not change the circuit connection, but serves only to increase or decrease the tension of the biasing spring 90 on the accelerating relay. Thus, the current setting of the relay is varied and the value of the motor current which will be maintained by the operating device 24 and the controller 25 is adjusted.

Figure 8:
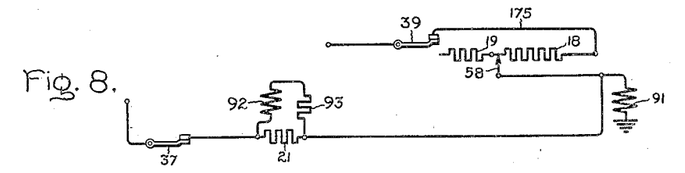

Continuing now with the description of the operation, it will be seen upon reference to Fig. 2 that as the brush arm 58 moves from its A position toward its B position, the resistor 18 is progressively excluded from the motor circuit so that when the brush arm 58 reaches its B position, only the resistor 19 is included in the motor circuit, the resistor 20 having been excluded by closure of the cushioning contactor 38. As soon as the brush arm 58 reaches its B position, the transfer switch 39 is energized so as to open its lower contacts and close its upper contacts, thereby excluding the resistor 19 from the motor circuit and reinserting the resistor 18, the circuit from the transfer switch now extending through a conductor 175 which is connected to the upper contact of the transfer switch and to the opposite end of the resistor 18. The circuit through the transfer switch, the conductor 175, the resistor 18, and the brush arm 58 is now substantially as shown in Fig. 8, the brush arm 58 being in its B position.

The above referred to energizing circuit for the transfer switch 39 may be traced from the intersection of the previously energized conductors 160 and 161 through the conductors 176 and 177, the contacts 82 on the cam switch 26, which is closed with the cam switch in its B position, and by way of a conductor 178, the contacts 83 on the cam switch 26, which also are now closed, the conductors 179 and 180 and the energizing winding of the transfer switch 39 to the negative source of control energy.

Upon operation of the transfer switch 39 to its uppermost position, the previously traced energizing circuit for the winding 68 of the operating device 24 is interrupted at the interlock contacts 165 and accordingly the valves 66 and 67 move to their respective biased positions shown so as to apply pressure to the piston 62 and connect the timing chamber 70 to atmosphere, thereby to effect operation of the pistons 62 and 63 in a reverse direction so as to move the brush arm 58 on the controller 25 from its B position toward its A position. It will likewise be observed that the interlock contacts 149 on the transfer switch 39 open to interrupt the energizing circuit for the valve 44 of the field shunting means 23. This valve is maintained energized, however, through a circuit bypassing the interlock contacts 149, which circuit extends from the intersection of the conductors 147 and 148 through a conductor 181, the contacts 85 on the cam switch 26, which are now closed, and, by way of the conductors 182 and 152, to the winding of the valve 44.

As the brush arm 58 moves from its B position toward its A position, the resistor 18 is again excluded from the motor circuit and it will be apparent that when the brush arm reaches its A position, all of the resistors 18, 19, and 20 are excluded from the motor circuit. As soon as the brush arm reaches this A position, the contacts 85 on the cam switch 26 open to deenergize the operating winding of the valve 44 on the field shunting means 23 and accordingly the valve moves to its biased position to connect the upper side of the diaphragm 41 to atmosphere through the exhaust passage 46, as described above. Therefore, the biasing spring 43 immediately begins to move the plunger 42 upwardly so as to operate the conducting segments 48 and 49 into sequential engagement with the cooperating contacts 51 and 52 progressively to shunt the field windings on the motors.

The speed at which the contacts 50 and 51 are sequentially engaged by the segments 48 and 49 is controlled by the accelerating relay 27 in a manner similar to that in which the operating device 24 is controlled. It will be observed that whenever the movable contact 87 of the accelerating relay engages the back contact 89, an energizing circuit is completed for the operating winding of the plug valve 56, which circuit extends from the back contact 89 through a conductor 183, the interlock contacts 184 on the braking switch 34, and, by way of a conductor 185, to the operating winding of the plug valve 56 and the negative source of control energy.

As described above, energization of the plug valve 56 restricts the exhaust passageway 46 and accordingly slows down the movement of the plunger 42 and it will be understood that the shunt coil 94 cooperates with the energizing winding of the plug valve 56 in the same manner as it cooperates with the stop coil 80 on the operating device 24 to provide a vibratory action. The shunt winding 94 under these conditions is energized in parallel circuit relation with the operating winding of the plug valve 56 through the previously traced energizing circuit for the stop coil 80. Upon completion of the field shunting operation, the motors are connected directly across the source of energy with all of the resistance excluded from the motor circuit and with the fields shunted, this constitutes the final accelerating connection.

It will be remembered that the energizing circuit for the transfer switch 39 includes the contacts 82 and 83 of the cam switch 26. In order to maintain the transfer switch 39 in its uppermost position when the cam switch 26 and the brush arm 58 return to their respective A positions to complete the accelerating operation, a holding circuit is provided for bypassing the contacts 82 and 83. This holding circuit, which is completed only when both the cushioning contactor 38 and the transfer switch 39 are in their respective energizing positions, extends from the intersection of the previously energized conductors 163 and 164 through the interlock contacts 186 on the transfer switch 39, the conductors 187 and 188, the interlock contacts 189 on the cushioning contactor 38, and by way of the conductors 190 and 180 to the energizing winding of the transfer switch 39 and the negative source of control energy. Thus, the final accelerating circuits are maintained until the master controller is returned to its switching position.

As explained hereinbefore, my improved control system includes means for adjusting prior to the initiation of the braking operation the amount of resistance in the braking circuit so as to ensure quick build-up of the dynamic braking current when braking is called for. In describing the braking operation, it will first be assumed that the vehicle is operating at its maximum speed.

The first step in initiating the braking operation is to move the master controller 28 from its running position to its off position, thus to open the cam switches 99, 100, 102, and 103 and to close the cam switch 101. Opening of the above referred to cam switches of course interrupts the previously traced energizing circuits for the line switches 30 and 31, and closure of the cam switch 101 establishes energizing circuits for the braking switch 34 and a field flashing contactor 200 so as to connect the motors and the resistors in the coasting circuit shown in Fig. 3. The field windings of the motors are shunted, as shown, since the master controllers 28 and 29 are in their respective off positions corresponding to coasting operation. This shunting substantially disables the operation of the motor as a series generator.

The energizing circuit for the braking switch 34 may be traced from the positive source of control energy through the control switch 110, the conductors 112 and 191, the cam switch 101, the conductors 192 and 193, the interlock contacts 194 on the line breaker 30, the conductor 195 the interlock contacts 196 on the line breaker 31, the conductors 197, 198, and 199, and by way of the energizing winding of the braking switch 34 to the negative source of control energy. The energizing circuit for the field flashing contactor 200 extends from the intersection of the conductors 198 and 199 through the winding of the field flashing contactor to the negative source of control energy.

Closure of the contacts 36 on the breaking contactor 34 is effective to connect the resistor 22 across the two common connection points 129 and 133, the circuit extending from the connection point 129 through a conductor 201, the contacts 36, a conductor 202, the resistor 22, and by way of the conductors 203 and 137 to the common connection point 133. Likewise, closure of the contacts 35 and 37 on the braking switch 34 is effective to connect the resistors 18, 19, 20, and 21 in a braking circuit which extends between the midpoints of the two opposite arms of the parallel bridge circuit in which the motors are permanently connected. This braking circuit extends from the conductor 131, which connects the armature of the motor 12 to the field winding 16, through a conductor 204, the contacts 35, the conductors 205 and 140, the resistor 20, the conductor 141, the lower contacts of the transfer switch 39, the conductor 142, resistors 19 and 18, the movable brush arm 58, the conductor 143, the resistor 21, the conductors 206 and 207, the contacts 37, and by way of a conductor 208 to the conductor 135, which connects the armature of the motor 11 to the field winding 15.

Thus, it will be seen that the resistors 18, 19, 20, and 21 are connected across two terminals of the bridge circuit, while the resistor 22 is connected across two other terminals of the bridge circuit. These connections are shown best in Figs. 3 and 4, and as is pointed out more fully in the above referred to sole Tritle application, these connections are particularly effective in providing automatic field shunting of the motors during the dynamic braking operation.

As stated above, the winding 92 of the relay 27 is connected across the resistor 21 for energization in accordance with the braking current. With the master control means in the coasting position the calibrating resistance 93 is short-circuited and accordingly the circuit for the winding 92 extends from one side of the resistor 21 through the conductors 144, 209, and 210, the cam switch 105 on the braking controller 29, the conductors 211 and 212, the winding 92 and by way of a conductor 213 to the other side of the resistor 21. The calibrating resistor being short-circuited, the relay 27 is set for low or nominal current values and controls the operation of the device 24 in a manner to be more fully described hereinafter.

Energization of the field flashing contactor 200 is effective to connect a field flashing battery 214 across two of the motor fields 14 and 15 so as to ensure build-up of the motors 10 and 11 as generators with shunt field characteristics. As shown in Fig. 1, the negative side of the battery is connected directly to ground and the flashing circuit for the field windings may be traced from the other side of the battery through the contacts of the field flashing contactor 200, a current limiting resistor 215, the conductors 216, 128, and 134, the field windings 14 and 15, the conductors 135 and 203, the contacts 37 on the braking switch 34, the conductors 207 and 206, the resistor 21, the conductors 144 and 145, the series winding 91 on the relay 27, and by way of the ground connection 33 to the negative side of the battery.

Figure 3:
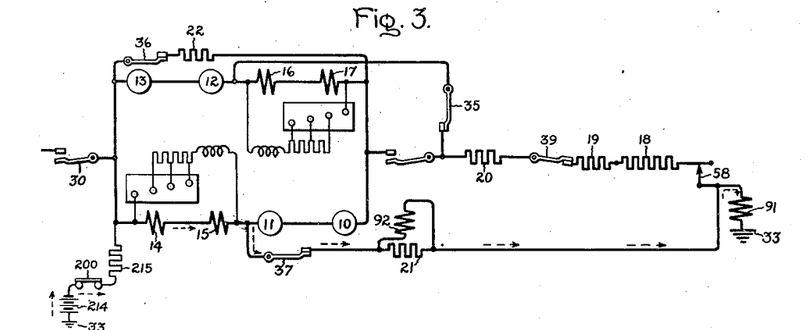
Fig. 3 is a similar circuit diagram illustrating the circuit connections established during coasting.
Figure 4:
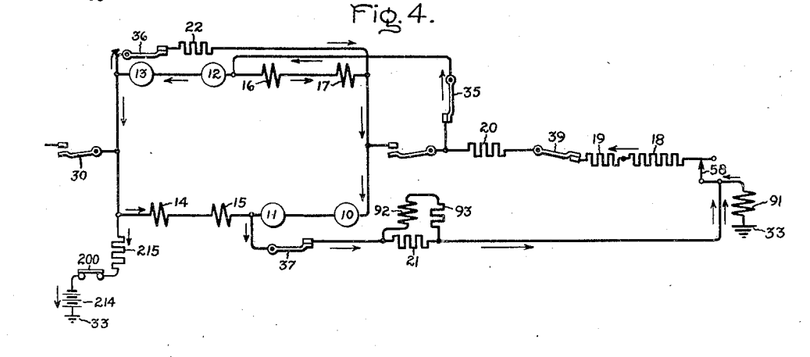
Figs. 4 to 9 inclusive are similar simplified diagrams illustrating various stages in the braking operation.

In Fig. 3, the direction of the field flashing current is indicated by broken arrows. As described in the above-mentioned Tritle and McNairy application, by properly proportioning the battery 214 with relation to the voltage drops in the circuit during the dynamic braking operation, a portion of the braking current is caused to flow through the battery in such a direction that the battery is charged during the braking operation. In Fig. 4, the braking current is indicated by solid arrows and it will be seen that a portion of this braking current flows through the current limiting resistor 215, the contacts of the field flashing relay 200, the battery 214, the ground connection 33, and the series winding 91 in a direction such that the battery is charged.

Simultaneously with the establishment of the above described circuits, an energizing circuit is established for the operating winding 68 of the operating device 24 which extends from the intersection of the previously energized conductors 197 and 198, through a conductor 217, a pair of interlock contacts 218 and 219 on the braking switch 34, the conductors 220, 176, 161, 162, 163, and 164, the interlock contacts 165 on the transfer switch 39, and by way of the conductors 166 and 167 to the winding 68.

Likewise, an energizing circuit is completed for the speed coil 81 of the device 24, which circuit extends through the front contact 88 of the relay 27, as set forth above in connection with the accelerating operation, and accordingly the device 24 begins to operate the brush arm 58 toward its B position to exclude the resistor 18. However, the total value of the resistors 18 and 21 inclusive is so selected that with the vehicle operating at its maximum speed and with the shunted fields flashed, the motors 10 and 11 start to build up as generators having characteristics approaching shunt field characteristics by reason of the field flashing and accordingly the relay 27 operates to open the circuit of the speed coil 81 and to close the circuit of the stop coil 80.

It will be remembered that during coasting the winding 92 of the relay 27 is connected directly across the resistor 21 and therefore the relay is set to respond to low current values. It will be observed that the response of the winding 92 to current is also a response to the speed of the motor or vehicle. As the current builds up in the coasting circuit, the winding 92 effects operation of the contact 87 out of engagement with the contact 88 and into engagement with the contact 89 to energize the stop coil. The shunt winding 94 again effects a vibratory opening and closing of the contact 89, the continued slow movement of the device 24 soon causing the motor current to build up to a predetermined nominal low value at which the shunt coil 94 does not cause separation of the contacts 87 and 89. This nominal value of current in the dynamic braking circuit is so low in value that no substantial dynamic braking torque is applied. By reason of the field shunting at the time a larger current is used than would otherwise be permissible. Thus, the operating device 24 is stopped, the arm 58 having been operated in response to current, and therefore speed, to a position such as to adjust properly the amount of resistance to give a predetermined effective braking torque when the field shunts are removed.

In order to initiate braking now, it is necessary only to move the braking controller 29 from its off position to its service position. It will be understood, however, that if braking is delayed so that the speed of the car decreases during coasting the operating device 24 is operated under the control of the current coil 92 to still further actuate the arm 58 and reduce the resistance to correspond with the reduced speed of the car. This is an important feature of my invention. Movement of the controller 29 to its service position energizes the field shunting means 23 and inserts the calibrating resistance 93 in circuit with the winding 92 of the relay 27. Thus, the field windings of the motors are unshunted to restore the motor to generator operation and the motors quickly build up as generators with accumulative compound characteristics by reason of the field flashing, the setting of the relay 27 being abruptly adjusted for the predetermined dynamic braking current so as to provide for proper operation of the brush arm 58 to maintain this effective predetermined braking current.

Movement of the braking controller 29 to its service position thus completes an energizing circuit for the operating winding of the valve 44 on the field shunting means, which circuit may be traced from the previously energized interlock contact 218 on the braking controller 34 through a similar interlock contact 221, the conductors 222 and 223, the cam switch 106 on the braking controller 29, and by way of the conductors 224, 151, and 152 with the operating winding of the valve 44.

As soon as the motor fields are unshunted, the motors build up quickly as generators and the current setting of the relay 27, having been abruptly changed, the dynamic braking force becomes immediately effective. This abrupt change in the setting of the relay 27 is accomplished by the cam switch 105 which opens to remove the short-circuit from around the calibrating resistance 93. When the operating winding 68 of the operating device 24 is energized under the control of the relay 27 to increase the braking current to the predetermined value, the operating device 24 continues its movement in a direction to operate the brush arm 58 from its A position toward its B position to exclude the resistor 18 from the braking circuit and the relay 27 operates to control the speed of the device 24 and the brush arm, the series winding 92 of the relay 27 being connected in series with the calibrating resistance 93 across the resistor 21 in the braking circuit, as shown in Fig. 4.

The operating device 24 of course moves at its normal low speed since the energizing circuit for the speed coil 81, which circuit extends through the contact 88 on the relay 27 and through the cam switch 104 of the braking controller, is now interrupted at the cam switch 104. Whenever the braking current exceeds a predetermined value, the back contact 89 of the relay 27 is engaged by the movable contact 87 to energize the stop coil 80, as described above in connection with the accelerating and coasting operations and thus the speed of operation of the brush arm 58 is controlled.

Figure 5:
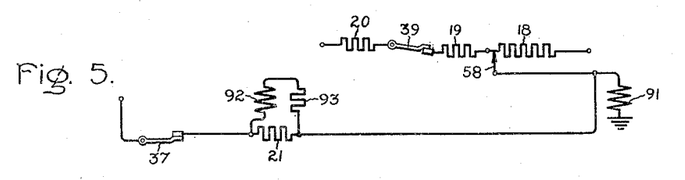
Figure 6:
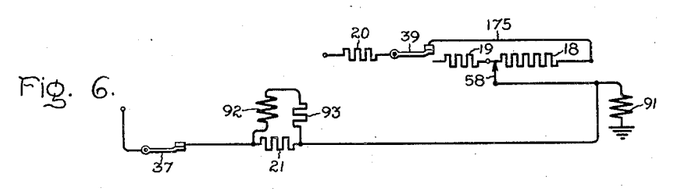

When the brush arm 58 reaches its B position, the resistor 18 is entirely excluded from the braking circuit, as shown in Fig. 5, and the transfer switch 39 will be immediately energized by closure of the contacts 82 and the contacts 83 on the cam switch 26. The circuit for energizing the transfer switch 39 extends from the interlock contact 219 on the braking switch 34 through the conductors 220 and 177, the contacts 82, the conductor 178, the contacts 83, and by way of the conductors 179 and 180 to the energizing winding of the transfer switch 39. Thus, the resistor 19 is quickly excluded from the braking circuit and the resistor 18 is reinserted, the connections being as shown in Fig. 6.

It will be observed that when the transfer switch 39 is operated to its uppermost position, a small auxiliary relay 225 is moved to its closed position by a finger 226 carried by the transfer switch, the relay 225 thereupon sealing itself closed through a circuit which may be traced from the previously energized interlock contact 218 on the braking switch 34, through a cooperating interlock contact 227, a conductor 228, the windings and the contacts of the relay 225, and by way of the conductors 229, 168, 157, and 158, through the energizing winding of the cushioning contactor 38 to the negative source of control energy.

It will thus be seen that with the braking switch 34 closed, operation of the transfer switch 39 to its uppermost position effects energization of the cushioning contactor 38. The cushioning contactor, however, is held against operation to its closed circuit position so long as the transfer switch 39 is in its uppermost position by a mechanical interlock comprising a pivoted lever 230 which is normally biased by a spring 231 to the ineffective position shown. Upon operation of the transfer switch 39 to its uppermost position, the lever 230 is moved by a cam 232 carried by the transfer switch so that the upper end of the lever 230 extends into the path of movement of the cushioning contactor 38 and thereby prevents operation of the cushioning contactor to its closed circuit position. It will be apparent, however, that the interlock lever 230 is effective to control the cushioning contactor 38 only if the transfer switch 39 is energized prior to energization of the cushioning contactor, since the cushioning contactor, once it has been operated to its closed circuit position, is not affected by operation of the interlocking lever 230.

As described above in connection with the accelerating operation, movement of the transfer switch 39 to its uppermost position interrupts the energizing circuit for the winding 68 at the interlock contacts 165 and accordingly the brush arm 58 immediately starts to move from its B position toward its A position again to exclude the resistor 18 from the braking circuit. As soon as the brush arm 58 reaches its A position, the contacts 83 on the cam switch 26 open to deenergize the transfer switch 39, whereupon the transfer switch moves to its lowermost position to reinsert the resistors 18 and 19 in the motor circuit, as shown in Fig. 7.

It will be remembered that the energizing circuit for the transfer switch 39 was initially completed through the contacts 82 and 83 on the cam switch 26. Although the contacts 82 open as soon as the brush arm 58 and the cam switch 26 move from their respective B positions, the energizing circuit for the transfer switch 39 is maintained until the contacts 83 open through a circuit which bypasses the upper one of the contacts 82. This circuit extends from the previously energized interlock contact 219 through the conductors 220, 176, 161, 162, and 163, the interlock contacts 186 on the transfer switch 39, and by way of the conductors 187, and 233 to the contacts 83 from which point it is identical with the energizing circuit previously traced.

Figure 7:
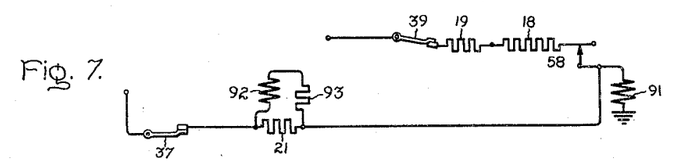

Immediately upon operation of the transfer switch 39 to its lowermost position, the interlock lever 230 releases the previously energized cushioning contactor 38 for movement to its closed circuit position so as to exclude the resistor 20 from the braking circuit and accordingly the circuit connections shown in Fig. 7 are established. At the same time, the cushioning contactor 38 seals itself in through the interlock contacts 159, which contacts establish a short-circuit around the energizing winding on the auxiliary relay 225 to permit the relay to open. This short-circuit extends from the intersection of the conductors 157 and 158 in the energizing circuit of the relay 225 through the interlock contacts 159, the conductors 160, 176, and 220, and by way of the interlock contact 219 to the interlock contact 227 in the previously traced energizing circuit of the relay 225.

Figure 9:
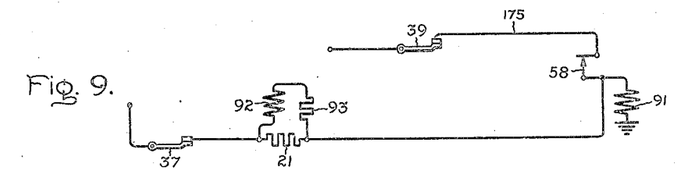

Upon operation of the transfer switch 39 to its lowermost position, the winding 68 of the operating device 24 is again energized through the interlock contacts 165 on the transfer switch and accordingly the brush arm 58 is again operated from its A position toward its B position to exclude the resistor 18 from the braking circuit a third time. As described above, as soon as the brush arm reaches its B position, the transfer switch 39 is energized through the contacts 82 and 83 on the cam switch 26, whereupon the resistor 19 is again excluded from the braking circuit and the resistor 18 is reinserted, as shown in Fig. 8. Again, operation of the transfer switch 39 to its uppermost position interrupts the energizing circuit of the winding 68 at the interlock contacts 165 and accordingly the brush arm 58 moves from its B position toward its A position progressively to exclude the resistor 18 from the braking circuit a fourth time. The final braking position is shown in Fig. 9, all of the resistors 18, 19, and 20 being excluded from the braking circuit, only the resistor 21 being retained to prevent short-circuiting of the motors.

The transfer switch 39 is maintained energized upon return of the cam switch 26 to its A position at the completion of the braking operation by the holding circuit traced above in connection with the accelerating operation. Accordingly, the connections, shown in Fig. 9 are maintained until the braking controller 29 is returned to its off position, and the accelerating controller 28 is operated to interrupt the energizing circuit for the braking switch 34.

It will now be assumed that the vehicle is operating at some low speed, say for example, 20 miles per hour, when it is desired to initiate braking. When the coasting and field flashing circuits are established, as described above, in connection with braking from maximum speed, the device 24 immediately begins to operate the brush arm 58 from its A position toward its B position to exclude the resistor 18 and since the total resistance in the coasting circuit is considerably above the critical resistance of the motors at this low speed, the relay 27 remains in the position shown, completing the previously traced energizing circuit for the speed coil 80.

Accordingly, the brush arm 58 is moved through the above described cycle of operations and the transfer switch 39 and the cushioning contactor 38 are energized at the respective proper moments progressively to decrease the resistance in the coasting circuit until this resistance reaches a value at which the motors begin to build up. As soon as the motors start to build up as generators with characteristics approaching shunt field characteristics by reason of the field flashing, the relay 27 operates to stop the device 24 and the resistance in the circuit is thus adjusted to provide for immediate initiation of the braking operation upon movement of the master controller 29 to its braking position. At this low speed, of say, 20 miles per hour, the circuit connections established by operation during coasting of the device 24, the transfer means 39, and the cushioning contactor 38 are substantially as shown in Fig. 7.

While I have shown and described a preferred system in which the fields are shunted while the braking resistance is being adjusted during coasting, it should be understood that my invention is not limited to this arrangement. The adjusting operation may of course be accomplished during coasting with the fields fully excited by setting the relay 27 so as to maintain an extremely small coasting current. In such a case, however, there is considerable danger of the device 24 overshooting, i. e., moving too far so that the motors will build up and exert a braking force when such a force is not desired. In addition to practically eliminating this danger of overshooting, the feature of shunting the fields during coasting and initiating the braking operation simply by unshunting the fields provides a much quicker build-up of the dynamic braking force than is otherwise possible.

Moreover, the field shunting provides for immediate release of the dynamic braking when desired before the car has stopped in the same manner as is obtained with mechanical or air brakes. Thus by returning the braking controller 29 to its off position the fields are shunted and the braking effort immediately released.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States, is:—

1. In a control system for an electric vehicle, the combination of a motor, a braking resistance, control means for connecting said resistance in a series circuit with said motor to establish dynamic braking operation, and means responsive to the speed of said motor for adjusting the amount of said resistance initially connected in said braking circuit when said control means is operated to establish dynamic braking operation.

2. In a control system for an electric vehicle, the combination of a driving motor, a braking resistance, means including control means for connecting said resistance in a dynamic braking circuit with said motor, said control means being operable between predetermined limits to vary the resistance in said braking circuit, and means responsive to the speed of the vehicle for operating said control means to predetermine in accordance with the speed of the vehicle the amount of resistance included in said braking circuit when said control means is operated to initiate braking operation, thereby to ensure quick increase of the dynamic braking effort to a predetermined value.

3. In a control system for an electric vehicle, the combination of a driving motor, a motor controlling resistance for connection in circuit with said motor, a controller operable between predetermined limits for varying said resistance, master control means movable between a running position, a coasting position, and a braking position for selectively connecting said motor and said resistance in an accelerating or a braking circuit, and means responsive to the speed of the vehicle for operating said controller during coasting to predetermine in accordance with the speed of the vehicle the amount of said resistance included in circuit with said motor when said master control means is operated to said braking position.

4. The method of dynamically braking an electric vehicle having a driving motor which consists in partially disabling said motor for generator operation and connecting said motor in a dynamic braking circuit, adjusting the resistance of said dynamic braking circuit to a value which would produce a predetermined dynamic braking torque if said motor were not partially disabled as a generator, and then restoring said motor to generator operation to initiate dynamic braking.

5. The method of dynamically braking an electric vehicle having a driving motor provided with a field winding which consists in connecting the motor in a dynamic braking circuit with the excitation of the motor field substantially disabled, adjusting the resistance of said dynamic braking circuit to a value which would produce a predetermined dynamic braking torque if the field of the motor were not disabled, and then restoring the operation of the motor field winding to initiate dynamic braking.

6. The method of dynamically braking an electric traction motor having a driving motor provided with a series field winding, which consists in connecting the motor in a dynamic braking circuit with the motor field winding substantially disabled, energizing said field winding to cause the motor to build up as a generator with shunt field characteristics, adjusting the resistance of the dynamic braking circuit to maintain a predetermined low value of current in said circuit at which substantially no dynamic braking effort is applied to the vehicle whereby the resistance of the dynamic braking circuit is adjusted to a value which would cause the motor to produce a predetermined braking torque if its field winding were not disabled, and then restoring the operation of the motor field winding to initiate the braking operation.

7. In a control system for an electric vehicle, the combination of a driving motor having a series field winding, a braking resistance, means for connecting said motor in series with said resistance for dynamic braking, means for shunting said field winding, means responsive to the speed of the vehicle for adjusting the amount of said resistance in series with said motor, and means for unshunting said field winding to initiate braking.

8. In a control system for an electric vehicle, the combination of a driving motor having a series field winding, a braking resistance, means for connecting said traction motor in series with said resistance for dynamic braking, means for shunting said field winding, means responsive to the speed of said vehicle operable while said field is shunted for adjusting the amount of said resistance connected in said braking circuit, and means for unshunting said field to initiate dynamic braking.

9. In a control system for an electric vehicle, the combination of a driving motor having a series field winding, a braking resistance, a controller operable between predetermined limits to vary said resistance, means for shunting said field winding, means for connecting said motor and said resistance in a braking circuit with said field shunted, means responsive to the speed of said vehicle for operating said controller to vary said resistance while said field is shunted, and means for unshunting said field to initiate dynamic braking.

10. The method of dynamically braking an electric vehicle having a series excited driving motor and a controller operable to vary the resistance in circuit with said motor, which consists in connecting the motor and a resistance in a braking circuit with the motor field shunted, operating said controller to adjust the value of said resistance in accordance with the speed of the vehicle, and then unshunting the motor field to initiate the braking operation.

11. In a control system for an electric vehicle, the combination of a motor having a field winding, a braking resistance, means for connecting said resistance in series with said motor to form a dynamic braking circuit during coasting operation of the vehicle, means for partially disabling said field winding during coasting operation, and means responsive to the current in said motor for adjusting the amount of said resistance during coasting to maintain a predetermined current in said dynamic braking circuit of such low value that no substantial braking torque is produced, whereby said resistance is adjusted to a value providing a predetermined dynamic braking torque upon restoration of the operation of said field winding.

12. In a control system for an electric vehicle, the combination of a motor having a series field winding, a braking resistance, means for connecting said resistance in series with said motor to form a dynamic braking circuit during coasting operation of the vehicle, means for shunting said series field winding during coasting operation, means responsive to the current in said motor for adjusting the amount of said resistance during coasting to maintain a predetermined current in said dynamic braking circuit of such low value that no appreciable braking torque is produced whereby said resistance is adjusted to a value providing a predetermined dynamic braking torque upon removal of said field shunting means.

13. In a control system for an electric vehicle, a combination of a motor having a field winding, a braking resistance, means for connecting said resistance in series with said motor to form a dynamic braking circuit during coasting operation of the vehicle, means for partially disabling said field winding during coasting operation, connection for passing a current through said field winding during coasting to cause said motor to build up as a generator, means responsive to the current in said motor for adjusting the amount of said resistance during coasting to maintain a predetermined current in said dynamic braking circuit of such low value that no appreciable braking torque is produced whereby said resistance is adjusted to a value providing a predetermined dynamic braking torque upon restoration of the operation of said field winding.

14. In a control system for an electric vehicle or the like, the combination of a driving motor having a series field winding, a braking resistance, means for connecting said resistance in series with said motor to establish a dynamic braking circuit, means for shunting the field winding of said motor, means for passing a current through said field winding to cause said motor to build up as a generator with shunt field characteristics whereby a current is caused to flow in said dynamic braking circuit, means responsive to said current for adjusting said resistance to maintain said current at a predetermined low value producing no substantial braking torque to thereby adjust said resistance to a value giving a predetermined dynamic braking torque when said shunting means is removed from said field winding.

15. In a control system for an electric vehicle, the combination of a driving motor, a resistance, a controller operable between predetermined limits for varying said resistance, means responsive to the current in said motor for controlling said controller, master controller means movable to a running position to connect said resistance in circuit with said motor for motoring operation, to a coasting position to connect said resistance in a dynamic braking circuit with said motor and to partially disable said motor for generator operation, and to a braking position for restoring said motor to generator operation, and means responsive to the operation of said master controller to said coasting position for adjusting said current responsive means for operation of said controller to maintain a predetermined current in said dynamic braking circuit of such low value that no substantial braking torque is produced whereby said resistance is adjusted to a value providing a predetermined dynamic braking torque upon movement of said master controller to said braking position.

16. In a control system for an electric vehicle, the combination of a motor having a series field winding, a resistance, a controller operable between predetermined limits for varying said resistance, means responsive to the current in said motor for controlling said controller, master controller means movable to a running position to connect said resistance in circuit with said motor for motoring operation, to a coasting position to connect said resistance in a dynamic braking circuit with said motor and to shunt said field winding, and to a braking position to unshunt said field winding, and means responsive to the operation of said master controller to said coasting position for adjusting said current responsive means for operation of said controller to maintain a predetermined current in said dynamic braking circuit of such low value that no substantial braking torque is produced whereby said resistance is adjusted to a value providing a predetermined dynamic braking torque upon movement of said master controller to said braking position.

17. In a control system for an electric vehicle, the combination of a motor having a series field winding, a resistance, a controller operable between predetermined limits for varying said resistance, means responsive to the current in said motor for controlling said controller, master controller means movable to a running position to connect said resistance in circuit with said motor for motoring operation, to a coasting position to connect said resistance in a dynamic braking circuit with said motor and to shunt said field winding, and to a braking position to unshunt said field winding, and means responsive to the operation of said master controller to said coasting position for energizing said field winding to cause said motor to build up as a generator with shunt field characteristics and for adjusting said current responsive means for operation of said controller to maintain a predetermined current in said dynamic braking circuit of such low value that no substantial braking torque is produced whereby said resistance is adjusted to a value providing a predetermined dynamic braking torque upon movement of said master controller to said braking position.

18. In a control system for an electric vehicle, the combination of a driving motor, a motor controlling resistance for connection in circuit with said motor, a controller operable between predetermined limits for varying said resistance, master control means movable between a running position, a coasting position, and a braking position for selectively connecting said motor and said resistance in an accelerating or a braking circuit, current responsive relay means for controlling the operation of said controller to maintain a substantially constant motor current, and means responsive to movement of said master control means between said coasting and said braking positions for adjusting the setting of said relay means to operate said controller so that a nominal braking current is maintained during coasting and an effective braking current is maintained during braking.

19. In a control system for an electric vehicle, the combination of a driving motor, a motor controlling resistance for connection in circuit with said motor, a controller operable between predetermined limits for varying said resistance, master control means movable between a running position, a coasting position, and a braking position for selectively connecting said motor and said resistance in an accelerating or a braking circuit, movement of said master control means to said coasting position being effective to connect said motor and said resistance in said braking circuit, means for supplying a current to said series field winding during coasting to cause said motor to build up as a generator with shunt field characteristics, means responsive to the current in said braking circuit for controlling the operation of said controller during coasting to adjust said resistance, and means responsive to movement of said master control means to said braking position for changing the setting of said relay means to a higher current value.

20. In a control system for an electric vehicle, the combination of a driving motor having a series field winding, a motor controlling resistance for connection in circuit with said motor, a controller operable between predetermined limits for varying said resistance, master control means movable between a running position, a coasting position, and a braking position for selectively connecting said motor and said resistance in an accelerating or a braking circuit, current responsive relay means for controlling the operation of said controller to maintain a substantially constant current in said motor, means for shunting said series field winding, means responsive to movement of said master control means to said coasting position for connecting said motor and said resistance in a braking circuit with the motor field shunted, said current responsive relay means controlling the operation of said controller during coasting to adjust said resistance so as to maintain the current in said braking circuit at a nominal value, and means operable upon movement of said master control means to said braking position for unshunting said motor field and changing the setting of said relay means to a higher current value to effect increase of the braking current to an effective braking value.

21. In a control system for an electric vehicle, the combination of a driving motor, a braking resistance, means including a resistance controller for connecting said resistance in a braking circuit with said motor, said controller being operable to vary a portion of said resistance, relay means including an energizing winding connected across a portion of said braking resistance for operating said controller to maintain a substantially constant motor current, said relay means controlling said resistance controller during coasting operation to maintain a nominal motor current, and means for changing the setting of said relay means to effect increase of the motor current to a value effective for braking the vehicle.

22. In a control system for an electric vehicle, the combination of a driving motor, a braking resistance, means including a resistance controller for connecting said resistance in a braking circuit with said motor, said controller being operable to vary at least a portion of said resistance, relay means including an energizing winding connected across a portion of said braking resistance for operating said controller to maintain a substantially constant motor current, said relay means controlling said resistance controller during coasting operation to maintain a nominal motor current, a calibrating resistance for said relay, and means for inserting said calibrating resistance in circuit with said energizing winding to change the setting of said relay to effect increase of the motor current to a value effective for braking the vehicle.

23. In a control system for an electric vehicle, the combination of a driving motor, a motor controlling resistance for connection in circuit with said motor, a controller operable between predetermined limits for varying said resistance, master control means movable between a running position, a coasting position, and a braking position for selectively connecting said motor and said resistance in an accelerating or a dynamic braking circuit, movement of said master control means to said coasting position being effective to connect said motor and said resistance in said braking circuit, relay means including an energizing winding connected across a fixed portion of said resistance for operating said controller during coasting to adjust said resistance so as to maintain the motor current at a nominal value, and means responsive to movement of said master control means to said braking position for changing the setting of said relay means to effect an increase of the motor current to an effective braking value.

24. In a control system for an electric vehicle, the combination of a driving motor, a motor controlling resistance for connection in circuit with said motor, a controller operable between predetermined limits for varying said resistance, master control means movable between a running position, a coasting position, and a braking position for selectively connecting said motor and said resistance in an accelerating or a braking circuit, movement of said master control means to said coasting position being effective to connect said motor and said resistance in said braking circuit, relay means including an energizing winding connected across a fixed portion of said resistance for operating said controller during coasting to adjust said resistance so as to maintain the motor current at a nominal value, a calibrating resistance for said relay, and means responsive to movement of said master control means to said braking position for inserting said calibrating resistance in circuit with said energizing winding to change the setting of said relay whereupon said controller is operated to effect an increase of the motor current to a value effective for braking the vehicle.

JACOB W. McNAIRY.